United States Patent [19]

Davey

[11] Patent Number: 4,910,000

[45] Date of Patent: Mar. 20, 1990

[54] METHOD OF EXTRACTING TUNGSTEN VALUES FROM TUNGSTEN CONTAINING ORES

[75] Inventor: Thomas R. A. Davey, Glen Waverley, Australia

[73] Assignee: The University of Melbourne, Victoria, Australia

[21] Appl. No.: 174,461

[22] PCT Filed: Jun. 25, 1987

[86] PCT No.: PCT/AU87/00182

§ 371 Date: Feb. 24, 1988

§ 102(e) Date: Feb. 24, 1988

[87] PCT Pub. No.: WO88/00249

PCT Pub. Date: Jan. 14, 1988

[30] Foreign Application Priority Data

Jun. 25, 1986 [AU] Australia .............................. PH6568

[51] Int. Cl.⁴ ....................... C01G 41/00; C22B 34/36
[52] U.S. Cl. ......................................... 423/53; 423/56; 423/57; 75/101 R; 75/108; 75/121
[58] Field of Search .............................. 423/53, 56, 57; 75/101 R, 108, 121

[56] References Cited

U.S. PATENT DOCUMENTS

| | | | |
|---|---|---|---|
| 787,758 | 4/1905 | Herrenschmidt | 75/121 |
| 1,081,571 | 12/1913 | Becket | 75/121 |
| 1,348,356 | 8/1920 | Giles | 75/121 |
| 3,047,361 | 7/1962 | Hubbard | 75/121 |
| 3,079,226 | 2/1963 | Newkirk | 75/121 |
| 3,256,058 | 6/1966 | Burwell | 423/56 |
| 3,271,104 | 9/1966 | Surls | 75/121 |
| 3,969,478 | 7/1976 | Zelikman et al. | 423/54 |
| 4,083,920 | 4/1978 | Beaton et al. | 423/56 |
| 4,115,513 | 9/1978 | Kulkami et al. | 423/54 |
| 4,167,555 | 9/1979 | Ganes | 423/53 |
| 4,168,296 | 9/1979 | Lundquist | 423/53 |
| 4,298,581 | 11/1981 | Douglas et al. | 423/55 |
| 4,298,582 | 11/1981 | Menashi et al. | 423/53 |
| 4,328,190 | 5/1982 | Beckstead et al. | 423/54 |
| 4,420,331 | 12/1983 | Van't Sant et al. | 423/53 |
| 4,457,776 | 7/1984 | Van't Sant et al. | 423/53 |
| 4,533,527 | 8/1985 | Farrell et al. | 423/55 |
| 4,624,703 | 11/1986 | Vanderpool et al. | 423/54 |
| 4,626,280 | 12/1986 | Vanderpool et al. | 423/53 |
| 4,626,425 | 12/1986 | Scheithauer et al. | 423/593 |
| 4,741,886 | 5/1988 | Vanderpool et al. | 423/56 |

FOREIGN PATENT DOCUMENTS 818117 8/1959 United Kingdom .................. 423/56

Primary Examiner—Gary P. Straub
Assistant Examiner—Paige C. Harvey
Attorney, Agent, or Firm—Scully, Scott, Murphy & Presser

[57] ABSTRACT

A method of extracting tungsten values from tungsten containing ores comprising step (i) forming a mixture of a tungsten containing ore and a first mineral acid adapted to consume acid consuming substances in the ore and step (ii) thereafter adding organic anions to produce a solution containing dissolved tungsten values.

34 Claims, No Drawings

METHOD OF EXTRACTING TUNGSTEN VALUES FROM TUNGSTEN CONTAINING ORES

This invention relates to the treatment of tungsten containing ores to achieve extraction of tungsten containing values.

The present invention provides a method of extracting tungsten values from tungsten containing ores comprising:

Step 1: forming a mixture of a tungsten containing ore and a first mineral acid effective to consume the acid consuming substances (such as carbonates) in the ore, and Step 2: thereafter adding an organic acid or a salt of an organic acid to produce a solution containing dissolved tungsten values.

The method preferably includes the further step of hydrolysing said solution to produce a precipitate containing tungsten values.

A preferred mineral acid for the consumption of acid consuming substances is sulphurous acid which may be added as sulphur dioxide. An alternative mineral acid for the consumption of acid consuming substances is sulphuric acid.

Hydrochloric acid or nitric acid or a blend of any of the above acids may also be used as said mineral acid. The use of sulphurous acid and hydrochloric acid together has advantages but is costly. The use of sulphurous acid to consume acid consumers and the use of sulphuric acid and sodium chloride to providce acidity and chloride ions is particularly preferred.

The organic anions are preferably selected from oxalate, formate, malonate, succinate and acetate. Of these, oxalate ions are preferred as, in general, the use of oxalate ions results in solution of tungsten values at lower temperatures than hydrolysis.

The solution is preferably separated from any undissolved residue prior to hydrolysis.

Chloride ions are preferably added in step (ii) if not already present.

After separation of the precipitate the remaining acid containing solution may be recycled.

The organic anions and chloride ions may be added as the acid or as salts.

Mixtures of organic acids may be used to promote solution of tungsten values.

The tungsten containing ore is preferably in finely divided state as this promotes solution of tunsten values.

Said solution may have direct industrial application but it is preferred that tungsten values be separated therefrom.

In one instance organic anions are added to said mixture at a temperature of 80° or less with 50° C. or less being more preferred.

In another instance organic anions are added to said mixture at boiling temperature.

The step of hydrolysing is conveniently conducted by heating said liquor above 80° C. and preferably boiling said liquor to obtain a hydrolysed tungsten precipitate.

The step of forming said mixture is conveniently conducted by forming a tungsten ore reaction medium containing a mineral acid and thereafter adding organic anions to said medium.

Said medium may contain up to 20% by weight of free mineral acid but preferably less than 10% by weight and less than 3% by weight is most preferred.

Chloride ions are preferably present in an amount of not less than 1% by weight, preferably less than 20% by weight and more preferably less than 10% by weight of said mixture and said organic anions.

The organic anions are preferably added to said mixture in a ratio or at least 1 part by weight to 1 part by weight of tungsten in said ore calculated as $WO_3$. The use of more than 4.5 parts by weight of organic anion to 1 part by weight of tungsten in said ore calculated as $WO_3$ is possible but is not preferred as for higher organic anion concentrations high free mineral acid concentrations are required to effect hydrolysis but if such higher free mineral acid ion concentrations can be tolerated then higher organic acid concentrations may be used.

The present invention has application to all tungsten containing ores but is particularly applicable to scheelite and wolframite.

In the case of scheelite the method preferably used includes digestion of scheelite ore with organic anion and mineral acid at a temperature of 80° C. or less, more preferably 50° C. or less, separating non-solubilized material to obtain a liquor containing tungsten values and thereafter heating the liquor to above 80° C., preferably to boiling, to hydrolyse to produce a tungsten containing precipitate.

In the case of wolframite the method preferably used includes digestion of wolframite ore with organic anion and mineral acid at a temperature of 50° C. or greater, preferably 80° C. or greater to obtain a liquor containing tungsten values and thereafter heating the liquor to above 80° C., preferably to boiling, to hydrolyse tungsten values to produce a tungsten containing precipitate.

The tungsten containing precipitate may be separated from the liquid in any convenient way and, dependant on the method used, may contain ore residues. The tungsten containing precipitate can be dissolved in ammonia and this can be used to separate the tungsten values from the ore residues.

The present invention can be applied to batch and continuous processes. The resulting solution obtained after the hydrolysis can be recycled with mineral acid, chloride ion or organic anion makeup when necessary.

The mineral acid for use in the method of this invention which is preferred when substantial acid consumers are present is sulphurous or sulphuric acids because these are relatively inexpensive. Sulphurous acid may be introduced into aqueous solution as sulphur dioxide.

Hydrochloric acid can be used as a source of chloride ions and as a mineral acid but it is cheaper to use a mixture of sulphuric acid and chloride ions which may be provided by adding an appropriate chloride such as sodium chloride.

The present invention will now be illustrated with the aid of the following Examples.

EXAMPLE I

To illustrate the removal of acid consumers, a material known as Cyclosiser Cone 6 overflow was selected. This material was very fine and the tungsten species present was almost entirely scheelite. The $WO_3$ content was 1.5% $WO_3$.

Step (ii)

Samples of 100 g were agitated with water saturated with sulphur dioxide and sulphur dioxide was blown through the agitated suspension. There was considerable effervescence as the carbonates in the solution wer consumed. The sample was then filtered, dried and weighted—the loss in weight was about 2%.

Step (ii)

This dried material was then stirred with 200 ml of a mixture of 3% oxalic plus 3% hydrochloric acid for one hour at 50° C. The mixture was filtered and the solution boiled to precipitate tungsten acid. After filtering, the solution was used on a further $SO_2$ treated 100 g sample. The process was repeated seven times and on each occasion there was over 90% extraction of contained $WO_3$. From this, it can be calculated that 6 g oxalic acid plus 6 g hydrochloric acid remove at least 9.5 g of $WO_3$. Obviously, this procedure could have been continued to give a higher figure for the amount of $WO_3$ removed.

EXAMPLE II

In a variation of Example I, a different approach to Step 1 was that of using treated ($SO_2$) material and titrating the acid mixture. After reaction with the 3% acid mixture, the titration showed that for the removal of 1.45 g of $WO_3$, there was a consumption of 2.82 g of acid mixture.

The following examples of Step 2 of the above process are provided as alternatives to Step 2 as described in Example I.

EXAMPLE A 1 g scheelite, 3 g oxalic acid and 100 ml of 5% by weight hydrochloric acid were heated at 50° C.

Samples were taken from the mixture so obtained at 30 minute intervals and analyzed for tungsten. This established that maximum extraction of tungsten into solution occurred 90 minutes after commencement.

After 90 minutes from commencement, tungsten began to precipitate in hydrolyzed form and heating was discontinued to avoid loss of tungsten.

The solution was then filtered to remove ore residues (0.08 g) and the resultant liquor which, on analysis contained about 6700 ppm of tungsten, was boiled to produce a hydrolyzed tungsten precipitate which was removed by filtration. The filtered solution contained 59 ppm of tungsten.

EXAMPLE B

The process of Example A was repeated using 2.5% by weight hydrochloric acid. Although good solubility of tungsten was obtained, the amount of tungsten precipitated by boiling was not particularly satisfactory.

EXAMPLE C

The process of Example A was repeated using 3.5% by weight hydrochloric acid. Good solubility of tungsten was obtained and 50% by weight of the tungsten precipitated on boiling.

EXAMPLE D

The process of Example A was repeated but with differences, as follows:

A. Oxalic acid was omitted. Tungsten was not dissolved in great quantity unless concentrated hydrochloric acid was used and there was rapid precipitation of hydrated tungsten. Thus, the solution produced required strong acid and had poor stability.

B. Hydrochloric acid was omitted. Tungsten dissolved rapidly but would not precipitate on boiling. Repeating this using wolframite in lieu of scheelite produced the same result, excepting for slow dissolution of tungsten.

C. The hydrochloric acid used was 3% by weight and 1 g of oxalic acid was used. Solution of tungsten occurred on boiling but only partial precipitation of hydrated tungsten occurred.

D. The hydrochloric acid used was 10% by weight and 1 g of oxalic acid was used. Solution of tungsten occurred and precipitation of hydrated tungsten occurred after 30 minutes.

E. The hydrochloric acid used was 5% by weight and 1 g of oxalic acid was used. Solution of tungsten occurred, but precipitation of hydrated tungsten also occurred rapidly.

F. The hydrochloric acid used was 5% by weight and 2 g of oxalic acid was used. Solution of tungsten occurred, and the solution was stable against substantial precipitation for about one hour.

G. Example A was repeated using different scheelite samples, and the solution obtained was found to be stable against precipitation for periods varying between 90 minutes and two hours.

From the above, it can be suggested that increasing hydrochloric acid concentration shortens the time for precipitation, whereas increasing oxalic acid concentration increases the time for precipitation.

EXAMPLE E

To demonstrate that solutions may be recycled, 1 g. of scheelite, 3 g of oxalic acid, and 100 ml of (a) 3% by weight and (b) 10% by weight hydrochloric acid were heated at 50° C. for 90 minutes. The solution was filtered and the residue was dried and weighed to provide a measure of extraction. The filtrate was boiled to precipitate hydrated tungsten, filtered again and to the filtrate so obtained was added a further 1 g of scheelite.

The above cycle was repeated 8 times to produce results as follows:

| Cycle 1 | (a) using 3% HCl | (b) using 10% HCl |
| --- | --- | --- |
| 1 | 0.04 | 0.05 |
| 2 | 0.12 | 0.08 |
| 3 | 0.07 | 0.07 |
| 4 | 0.10 | 0.25 |
| 5 | 0.08 | 0.07 |
| 6 | 0.20 | 0.12 |
| 7 | 0.13 | 0.14 |
| 8 | 0.13 | 0.17 |

The above results indicate that solutions can be recycled but show an increase in residue indicating decreased extraction towards the end of the sequence.

EXAMPLE F 1 g. wolframite, 3 g oxalic acid, and 100 ml of 15% by weight hydrochloric acid were heated to boiling to take tungsten into solution and left a residue of 0.12 g.

EXAMPLE G

Example F was repeated and left a residue of 0.14 g.

EXAMPLE H 1 g samples of wolframite in the grain size 105–210 micrometer were boiled with 100 ml of hydrochloric acid of various concentrations with and without oxalic acid for various times.

The resultant mixtures were filtered and the residues were washed with a 10% by volume ammonia solution to dissolve the precipitated hydrated tungsten. The resultant residues were removed by filtration and dried and weighed to obtain a measure of tungsten extraction.

| Experiment | Time at Boiling (min) | % HCl (by weight) | Oxalic Acid (g) | Residue (g) |
|---|---|---|---|---|
| A | 30 | 20 | — | 0.90 |
| B | 30 | 10 | 3 | 0.53 |
| C | 30 | 15 | — | 0.75 |
| D | 30 | 15 | 3 | 0.38 |
| E | 30 | 20 | — | 0.64 |
| F | 30 | 20 | 3 | 0.28 |
| G | 60 | 15 | 3 | 0.15 |
| H | 120 | 15 | 3 | 0.17 |

EXAMPLE I 1 g wolframite, 3 g oxalic acid, and 100 ml 10% by weight hydrochloric acid were heated at 40° C. for 17 hours and left a residue of 0.44 g.

This indicates that elevated temperatures are desirable in the case of wolframite.

EXAMPLE J 1 g wolframite was ground to a grain size of less than 1532 micrometers and was boiled for 1 hour with 3 g oxalic acid and 100 ml of 15% by weight hydrochloric acid. The solution was filtered, and the precipitation was washed with 5% by volume ammonia solution to dissolve precipitated hydrated tungsten. The residue was 0.01 g.

EXAMPLE K 1 g scheelite of particle size 210–500 micrometers, 3 g malonic acid and 100 ml of 5% by weight hydrochloric acid were heated at 50° C. for 2 hours.

The resultant solution was filtered and the precipitate was washed with 5% by volume ammonia to dissolve precipitated hydrated tungsten and left a residue of 0.11 g.

EXAMPLE L

Example K was repeated using formic acid and left a residue of 0.16 g. The claims defining the invention are as follows:

I claim:

1. A method of extracting tungsten values from tungsten containing ores comprising step (i) forming a mixture of a tungsten containing ore and a first mineral acid in an amount effective to consume the acid consuming substances in the ore to obtain a product, and step (ii) thereafter adding an organic acid or salt of an organic acid to said product in an amount effective to produce a solution containing dissolved tungsten values.

2. A method of extracting tungsten values as claimed in claim 1 wherein said first mineral acid is sulphurous acid.

3. A method of extracting tungsten values as claimed in claim 2 wherein said sulphurous acid is added as sulphur dioxide.

4. A method of extracting tungsten values as claimed in claim 1, wherein said first mineral acid is sulphuric acid.

5. A method of extracting tungsten values as claimed in claim 1, wherein said first mineral acid is hydrochloric acid.

6. A method of extracting tungsten values as claimed in claim 1, wherein said first mineral acid is nitric acid.

7. A method of extracting tungsten values as claimed in claim 1, wherein said first mineral acid is a mixture comprising at least two of sulphurous acid, sulphuric acid, hydrochloric acid and nitric acid.

8. A method of extracting tungsten values as claimed in claim 1, wherein step (ii) additionally includes adding a second mineral acid to acidify the product of step (i).

9. A method of extracting tungsten values as claimed in claim 8, wherein said second mineral acid is selected from one or more of sulphuric acid, hydrochloric acid and nitric acid.

10. A method of extracting tungsten values as claimed in claim 1 wherein an effective amount of said first mineral acid is utilized in step (i) to acidify said product of step (i).

11. A method of extracting tungsten values as claimed in claim 10 wherein an effective amount of said first mineral acid is utilized in step (i) to acidify said product of step (i) to a pH of 2 or less.

12. A method of extracting tungsten values as claimed in claim 8 or claim 9, wherein an effective amount of said second mineral acid is added to acidify said product of step (i) to a pH of 2 or less.

13. A method of extracting tungsten values as claimed inn claim 1 wherein the acid added in step (ii) is 1 to 10 parts by weight of hydrochloric acid, 1 to 12 parts by weight of nitric acid, or 0.25 to 5 parts by weight of sulphuric acid or an equivalent amount of a mixture thereof, per one part by weight of tungsten calculated as $WO_3$.

14. A method of extracting tungsten values as claimed in claim 1 wherein said organic acid or salts thereof are oxalic acid, formic acid, malonic acid, succinic acid, or acetic acid, or salts thereof.

15. A method of extracting tungsten values as claimed in claim 1 wherein said organic acid or salt thereof is based on oxalic acid.

16. A method of extracting tungsten values as claimed in claim 1, wherein an organic acid is added to said product.

17. A method of extracting tungsten values as claimed in claim 1, wherein an organic salt is added to said product.

18. A method of extracting tungsten values as claimed in claim 1, wherein a mixture of organic acids or salts thereof is used.

19. A method of extracting tungsten values as claimed in claim 1 wherein said product of step (i) and said organic acid or salts thereof are heated to 80° C. or less.

20. A method of extracting tungsten values as claimed in claim 1, wherein said product of step (i) and said organic acid or salts thereof are heated to 50° C. or less.

21. A method of extracting tungsten values as claimed in claim 1, wherein said organic acid or salt thereof is heated to about the boiling temperature and combined with said product of step (i).

22. A method of extracting tungsten values as claimed in claim 1, wherein said organic acids or salts thereof are present in an amount of up to 4.5 parts by weight per 1 part by weight of tungsten in said ore calculated as $WO_3$.

23. A method of extracting tungsten values as claimed in claim 1, wherein said organic acids or salts thereof are present in an amount of not less than 1.0 parts by weight per 1 part by weight of tungsten in said ore calculated as $WO_3$.

24. A method of extracting tungsten values as claimed in claim 1, wherein said organic acids or salts thereof are present in an amount of from 2 to 6 parts by weight per 1 part by weight of tungsten in said ore calculated as $WO_3$.

25. A method of extracting tungsten values as claimed in claim 1, wherein step (ii) is performed in the presence of chloride ions.

26. A method of extracting tungsten values as claimed in claim 25 wherein said chloride ions were added as a salt.

27. A method of extracting tungsten values as claimed in claim 25 wherein said chloride ions were added as hydrochloric acid.

28. A method of extracting tungsten values as claimed in claim 25, wherein said chloride ions are present in an amount not less than 1% by weight of said product of step (i) and said organic acid or salts thereof.

29. A method of extracting tungsten values as claimed in claim 25, wherein said chloride ions are present in an amount of not more than 20% by weight of said product of step (i) and said organic acids or salts thereof.

30. A method of extracting tungsten values as claimed in claim 25, wherein said chloride ions are present in an amount of less than 10% by weight of said product of step (i) and said organic acids or salts thereof.

31. A method of extracting tungsten values as claimed in claim 25 wherein said chloride ions are present in an amount of not less than 2–10 parts by weight per 1 part per weight of tungsten in said ore calculated as $WO_3$.

32. A method of extracting tungsten values as claimed in claim 1 including the further step of hydrolyzing said solution containing dissolved tungsten values of step (ii) to produce a precipitate containing tungsten containing values.

33. A method of extracting tungsten values as claimed in claim 32, wherein said solution containing dissolved tungsten values is separated from undissolved residue prior to said hydrolysis.

34. A method of extracting tungsten values as claimed in claim 32, including separating said precipitate and recycling the remaining acid containing solution to fresh tungsten containing ore.

* * * * *

UNITED STATES PATENT AND TRADEMARK OFFICE
CERTIFICATE OF CORRECTION

PATENT NO. : 4,910,000
DATED : March 20, 1990
INVENTOR(S) : Thomas R. A. Davey

It is certified that error appears in the above-identified patent and that said Letters Patent is hereby corrected as shown below:

Column 2, line 64: "Step (ii)" should read as --Step (i)--

Column 2, line 68: "wer" should read as --were--

Column 6, line 25: "inn" should read as --in--

Signed and Sealed this

Thirteenth Day of August, 1991

Attest:

HARRY F. MANBECK, JR.

Attesting Officer     Commissioner of Patents and Trademarks